United States Patent
Murphy et al.

(10) Patent No.: US 7,032,835 B2
(45) Date of Patent: Apr. 25, 2006

(54) CONVERGENT/DIVERGENT NOZZLE WITH MODULATED COOLING

(75) Inventors: Michael J. Murphy, Vernon, CT (US); Curtis C. Cowan, East Hampton, CT (US); Stephen A. Paul, Andover, CT (US); James P. Allore, South Windsor, CT (US); Meggan Harris, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 130 days.

(21) Appl. No.: 10/766,398

(22) Filed: Jan. 28, 2004

(65) Prior Publication Data

US 2005/0161527 A1 Jul. 28, 2005

(51) Int. Cl.
*B05B 7/16* (2006.01)
*B05B 12/00* (2006.01)
*B05B 1/24* (2006.01)
*B63H 11/10* (2006.01)

(52) U.S. Cl. ............... 239/128; 239/139; 239/265.19; 239/265.33; 239/265.39

(58) Field of Classification Search ............ 239/128, 239/265.19, 265.39, 265.33, 265.17, 265.25, 239/265.41, 139; 244/53 R
See application file for complete search history.

(56) References Cited

U.S. PATENT DOCUMENTS

| | | | |
|---|---|---|---|
| 4,043,509 A | 8/1977 | McHugh et al. | |
| 4,073,441 A * | 2/1978 | Nash et al. | 239/265.41 |
| 4,203,286 A | 5/1980 | Warburton | |
| 5,111,992 A | 5/1992 | Barcza | |
| 5,141,154 A | 8/1992 | Barcza | |
| 5,255,849 A * | 10/1993 | Mayer et al. | 239/127.3 |
| 5,364,029 A | 11/1994 | Barcza | |
| 5,522,546 A | 6/1996 | Jarvis | |
| 5,586,431 A | 12/1996 | Thonebe et al. | |
| 5,775,589 A | 7/1998 | Vdoviak et al. | |
| 5,794,851 A | 8/1998 | Barcza | |
| 5,799,874 A | 9/1998 | Eigenbrode et al. | |
| 5,813,611 A | 9/1998 | Cires et al. | |
| 5,833,139 A * | 11/1998 | Sondee et al. | 239/265.17 |
| 6,142,416 A * | 11/2000 | Markstein et al. | 244/53 R |
| 6,301,877 B1 | 10/2001 | Liang et al. | |
| 6,347,510 B1 | 2/2002 | McAlice et al. | |
| 6,398,129 B1 | 6/2002 | Johnson | |
| 6,607,355 B1 | 8/2003 | Cunha et al. | |

* cited by examiner

*Primary Examiner*—Davis Hwu
(74) *Attorney, Agent, or Firm*—Carlson, Gaskey & Olds

(57) ABSTRACT

A nozzle system includes a multiple of circumferentially distributed convergent flaps, divergent flaps and inter-flap seals which circumscribe an engine centerline and define the radial outer boundary of a gas path. Each divergent flap includes a multiple of cooling channels with respective intakes and outlets. As the nozzle transitions between positions, the divergent flap seals move relative a divergent flap longitudinal axis to modulate the cooling airflow which enters the separate intakes.

13 Claims, 6 Drawing Sheets

CONVERGENT/DIVERGENT NOZZLE WITH MODULATED COOLING

BACKGROUND OF THE INVENTION

The present invention relates to gas turbine engines having convergent/divergent nozzles, and more particularly to a nozzle divergent section cooling arrangement.

An exhaust nozzle optimizes the thrust produced within a gas turbine engine. In augmented gas turbine engines, convergent/divergent (CID) nozzles provide a multitude of nozzle positions. Flaps circumferentially distributed aft of the augmentor or exhaust duct form the convergent and divergent sections for which the nozzle is named. Flap seals disposed between adjacent flaps minimize gas leakage between flaps in both sections. The convergent section is pivotally connected to the augmentor or exhaust duct and to the divergent section. The divergent section is pivotally connected to the convergent section and to an external fairing positioned radially outboard of the divergent section. The opposite end of the external fairing is pivotally attached to a static outer casing which surrounds a portion of the nozzle. Together, the outer casing, the convergent and divergent sections, and the external fairing form a nozzle plenum.

Because of the high temperature of the core gas exiting the turbine and augmentor, nozzles are cooled with air bled off of the fan at a lower temperature and a higher pressure than that of the core gas flow passing through the nozzle. Cooling air enters the core gas path within the augmentor or exhaust duct via cooling holes in the augmentor or exhaust duct liner and subsequently passes into the nozzle as a layer of cooling air traveling along the surface of the nozzle flaps and flap seals. Cooling air within the nozzle plenum cools the opposite side of the flaps and flap seals.

Various amounts of cooling air are required to properly cool the divergent section at various operating conditions. In conventional nozzles, airflow is typically established based on the maximum airflow that would be required under the most adverse condition. This forced airflow continues to operate at other operating conditions where the full amount may not be required for cooling. The diversion of excess cooling air from the core airflow decreases the efficiency of the engine.

Accordingly, it is desirable to provide adequate cooling for the divergent sections while efficiently utilizing the cooling air.

SUMMARY OF THE INVENTION

The nozzle system according to the present invention includes a plurality of circumferentially distributed convergent flaps, divergent flaps and inter-flap seals which circumscribe an engine centerline and define the radial outer boundary of a core gas path.

Each divergent flap includes a multiple of cooling channels. Cooling airflow enters each channel through a corresponding intake and exits each channel through a set of discharge ports. The divergent flap intakes are arranged downstream of the hinge axis such that the intakes are selectively covered by the adjacent divergent flap seals. As the nozzle transitions between the open position and the closed position, the divergent flap seals move relative to the divergent flap longitudinal axis to modulate the cooling airflow that enters the separate intakes. A relatively large quantity of cooling airflow is directed through all the intakes to provide significant convective cooling of the divergent section during afterburner operations. In a relatively closed or non-afterburning position, the divergent flap seals are constricted toward the divergent flap longitudinal axis such that a lesser number of intakes are exposed to the cooling airflow. The cooling airflow which does not pass through the divergent flaps due to the blocked intakes combines with the core airflow and increases non-afterburning engine efficiency due in part to the associated decrease in pressure and momentum loss and increases efficiency of the engine.

The present invention therefore provides adequate cooling for the convergent and divergent sections while efficiently utilizing the cooling air

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
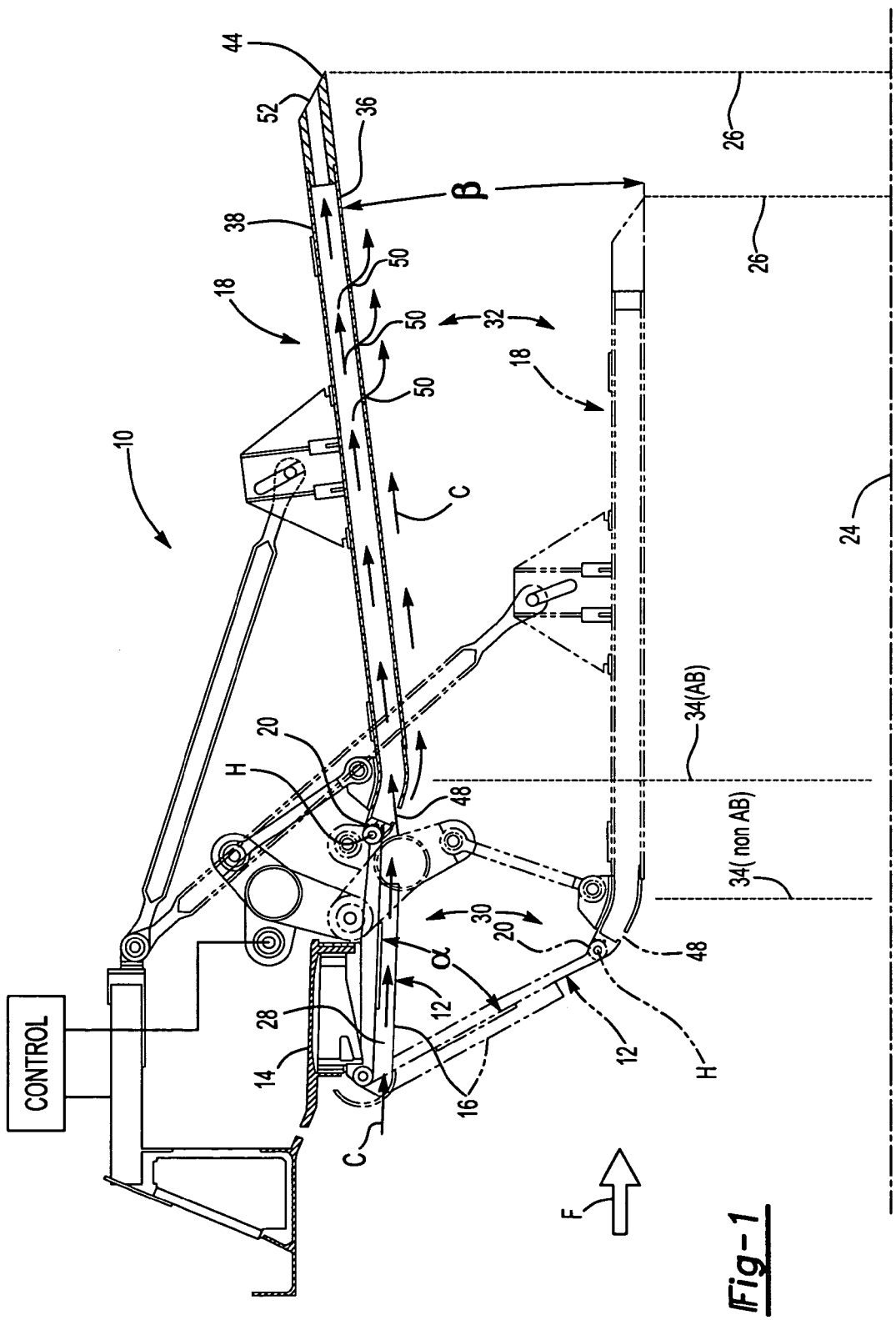
FIG. 1 is a general is a cross sectional side elevation view of a variable geometry exhaust nozzle of the present invention with the nozzle shown in open and closed positions, the nozzle being illustrated on only one side of its centerline.
Figure 2:
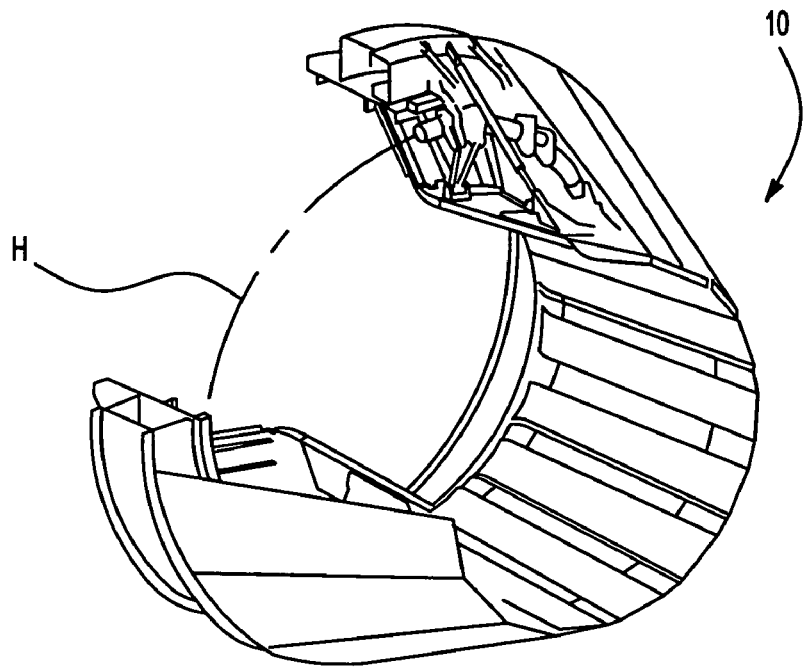
FIG. 2 is a perspective partial sectional view of a nozzle in a non-afterburning position.
Figure 3:
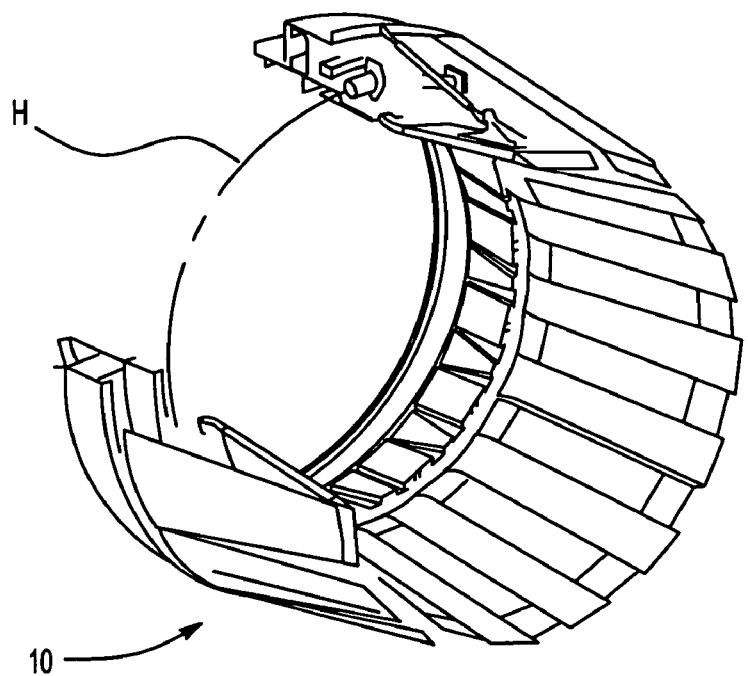
FIG. 3 is a perspective partial sectional view of a nozzle in an afterburning position.

FIG. 1 illustrates a sectional view of a nozzle system 10 for a gas turbine engine. FIG. 1 depicts the nozzle 10 in both an open position (solid lines and FIG. 2), which is used during afterburning operation, and in a closed position (phantom lines and FIG. 3), which is used during non-afterburning operation.

During operation, a control system governs the angular orientations of the convergent and divergent flaps to adjust the nozzle throat area and discharge area. The convergent flaps are positionable over a range of angular orientations $\alpha$, and the divergent flaps are similarly positionable over a corresponding spectrum of angular orientations $\beta$.

Figure 4:
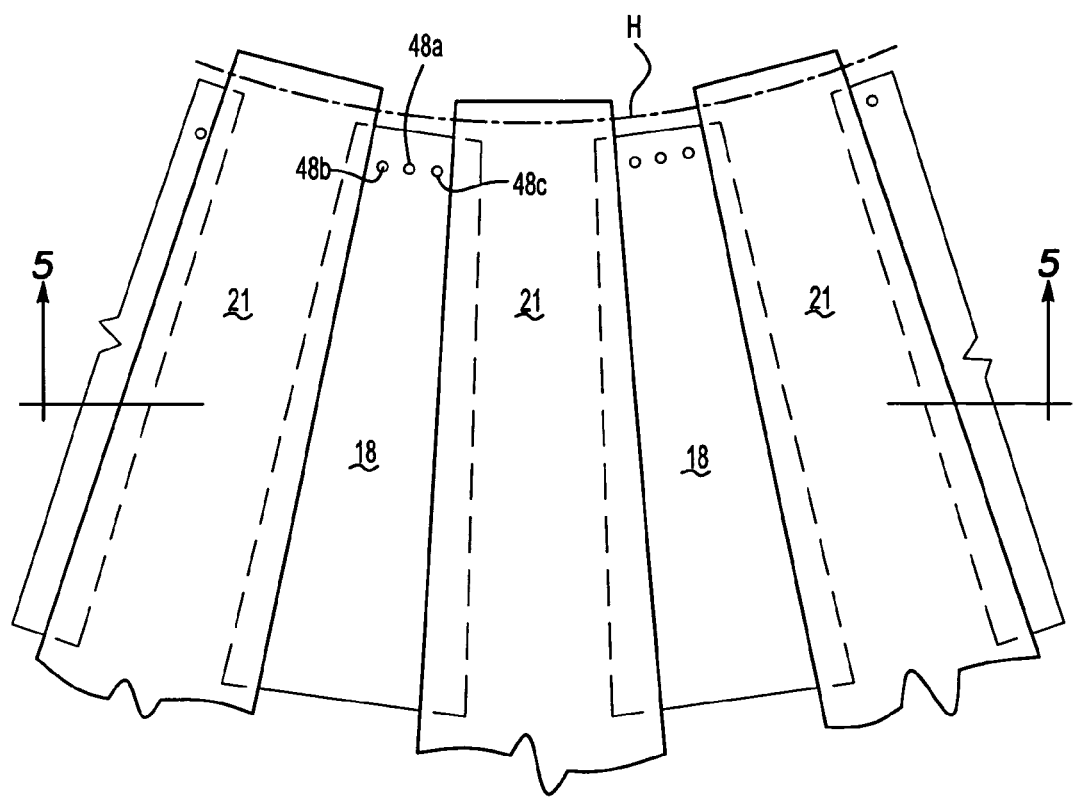
FIG. 4 is a facial inner view of a divergent section of the a nozzle system.
Figure 5:
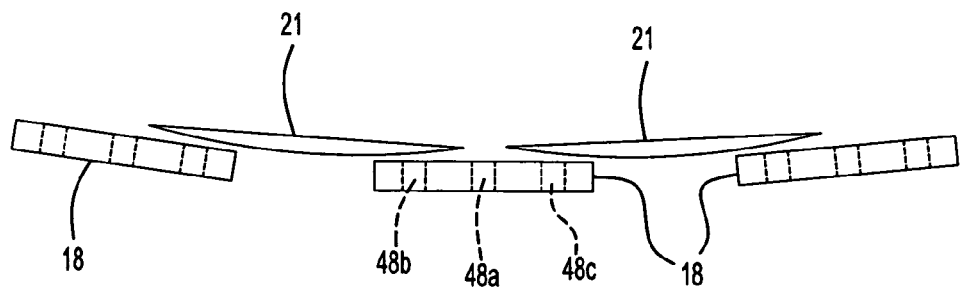
FIG. 5 is a sectional view of the divergent section of the a nozzle system taken along line 5—5 in FIG. 4.

The nozzle includes a plurality of circumferentially distributed convergent flaps 12, each pivotally connected to a stationary frame 14 and each having a liner panel 16 secured thereto. A plurality of circumferentially distributed divergent flaps 18 are pivotally connected at a joint 20 to the aft ends of the convergent flaps 12. A plurality of divergent flap seals 21 (FIGS. 4 and 5) are distributed circumferentially between the divergent flaps 18. Taken collectively, the convergent and divergent flaps and the inter-flap seals circumscribe an engine centerline 24 to define the radial outer boundary of a gas path 26.

The flaps 12, 18 define convergent and divergent sections 30, 32 of the nozzle with a throat 34 therebetween. The throat 34 is the minimum cross sectional area of the nozzle.

The liner panels 16, taken collectively, form a liner that cooperates with the convergent flaps 12 to define an annular cooling airflow passageway 28. The passageway 28 guides a cooling airflow (illustrated schematically be arrows C) along the radial inner surface of the convergent flaps 12. The cooling flow C is typically sourced from fan bypass airflow and/or other airflow that is different from a core airflow and combustion gas flow (illustrated schematically by arrow F). The cooling airflow C at least partially shields the flaps from the intense heat of the core airflow and combustion gas flow F.

Figure 6:
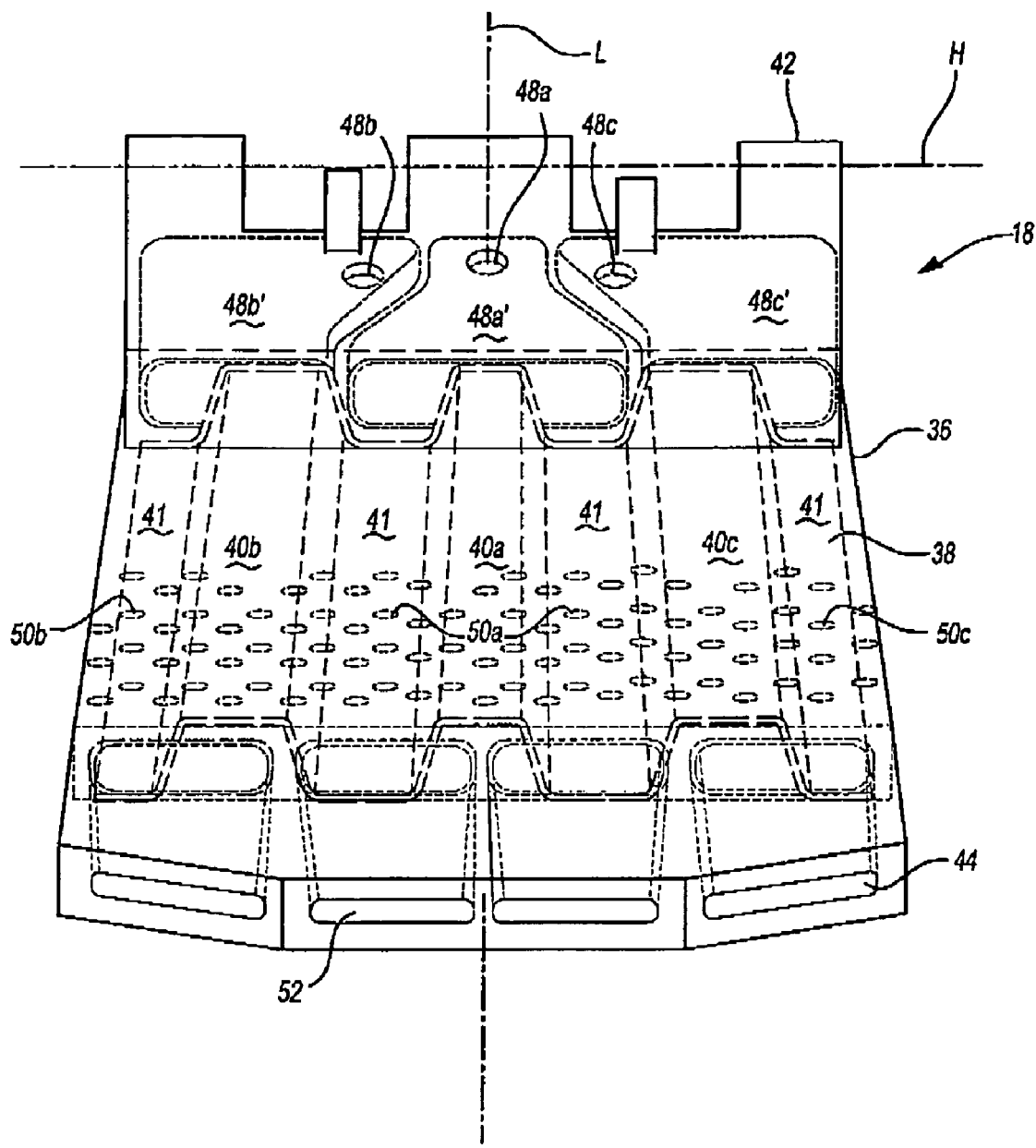
FIG. 6 is a perspective partial phantom view of a divergent flap according to the present invention.

Referring to FIG. 6, each divergent flap 18 includes an inner and outer skin 36, 38. The skins 36, 38 preferably form a multiple of channels 40 (three shown) therebetween. The channels 40 are formed separately with an internal rib structure 41 located between the relatively flat skins 36, 38 to impart structural rigidity and serve as a spacer to separate the skins 36, 38 and the channels 40. It should be understood that the inner skin 36 may alternatively form the channels directly and provide a corrugated surface.

The forward end of each divergent flap 18 includes a joint structure 42 that forms a portion of the joint 20 (FIG. 1). The joint structure 42 defines a hinge axis H that circumscribes the engine centerline 24. The aft end of each divergent flap 18 includes a tip section 44 which define a nozzle discharge plane 26 (FIG. 1), which provides a corresponding nozzle discharge area. It should be understood that separate or integral tip sections of various shapes and configurations will benefit from the present invention.

The cooling airflow C enters each channel 40 through a corresponding intake 48. Preferably, the intakes 48 penetrate the inner skin 36 of each divergent flap 18 (FIG. 1) adjacent to joint structure 42. The coolant intake is preferably located adjacent to joint 20 (FIG. 1) and downstream of the hinge axis H. It should be understood that various intake locations and arrangements will benefit from the present invention.

The intakes 48a, 48b, 48c are preferably congregated toward a longitudinal axis L of each divergent flap 18. Most preferably, intake 48a is located upon the longitudinal axis L and flanked by intakes 48b, 48c. The channel 40a from intake 48a is relatively straight while channels 40b, 40c from the respective intakes 48b, 48c include an angled transition to channel portions 48b' and 48c'.

Figure 7:
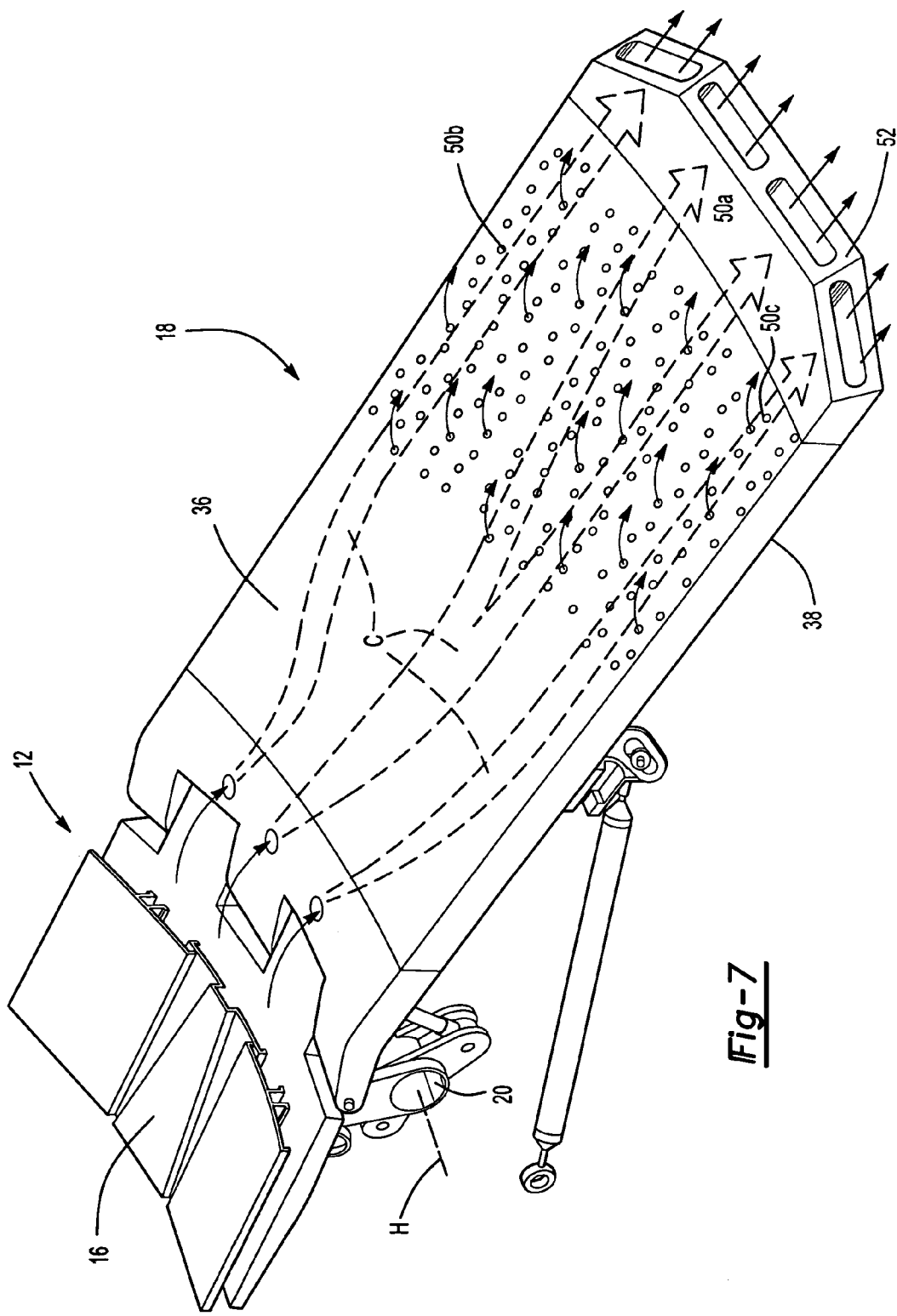
FIG. 7 is an inner perspective view of a divergent flap according to the present invention.

The coolant airflow exits each channel 40 through an outlet 50, which is preferably a set of discharge ports that penetrate the inner skin 36 aft of the intake 48 (FIG. 7). Alternatively or in addition, the outlet may be one or more discharge openings 52 at the aft end of the divergent flap 18 between the skins 36, 38. It should be understood that although the openings 48, 50, 52 are depicted as small apertures, other opening shapes and sizes will benefit from the present invention.

The divergent flap intakes 48a, 48b, 48c are arranged downstream of the hinge axis H such that the intakes 48b, 48c are selectively covered by the adjacent divergent flap seals 21. As the nozzle 10 transitions between the relatively open position (FIG. 2 and FIG. 8) and the relatively closed position (FIG. 3 and FIG. 9) the divergent flap seals 21 move relative to divergent flap longitudinal axis L. That is, the overlap between the flaps 18 and seals 21 change as a function of nozzle movement. The change in overlap modulates the cooling airflow into the separate intakes 48a, 48b, 48c and additional actuation systems need not be provided. It should be understood that although three intakes 48a–48c are disclosed in the illustrated embodiment, any number of intakes will benefit from the present invention.

Figure 8:
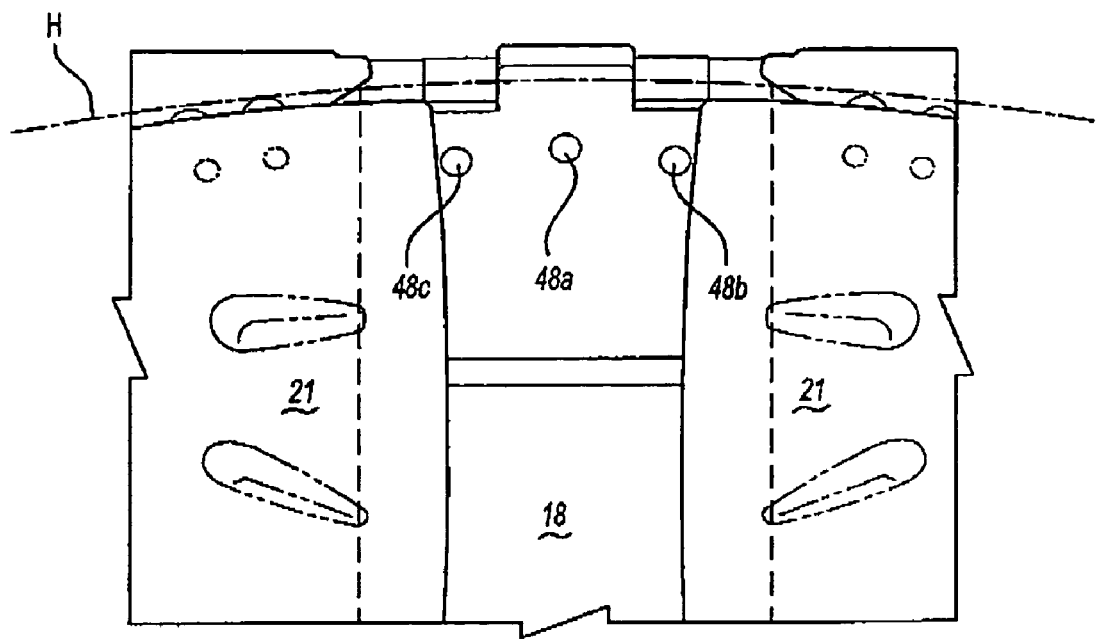
FIG. 8 is an expanded view of a divergent flap and seal arrangement in an afterburning position.

Referring to FIG. 8, the nozzle 10 is in a relatively open or afterburning position. The divergent flap seals 21 are dilated away from the divergent flap longitudinal axis L such that all the intakes 48a, 48b, 48c are exposed to the cooling airflow c from the convergent flaps 12. A relatively large quantity of cooling airflow is directed through all the intakes 48a, 48b, 48c downstream of the hinge axis H to provide significant convective cooling of the divergent section 32 during afterburner operations. A lesser quantity of cooling airflow is combined with the core airflow F.

Figure 9:
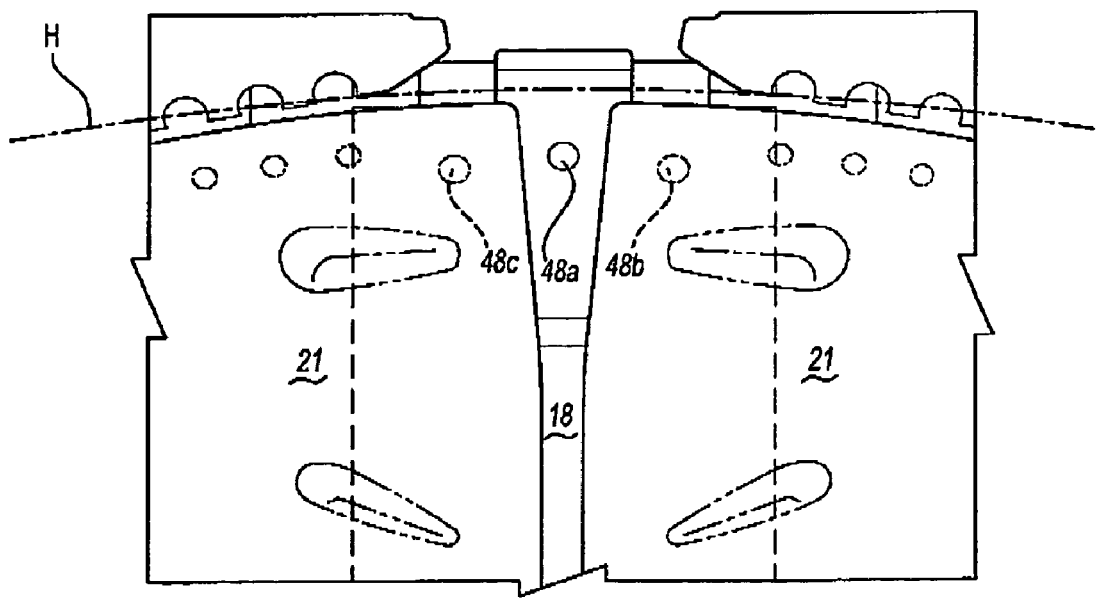
FIG. 9 is an expanded view of a divergent flap and seal arrangement in a non-afterburning position.

Referring to FIG. 9, the nozzle 10 is in a relatively closed or non-afterburning position. The divergent flap seals 21 are constricted toward the divergent flap longitudinal axis L such that only intake 48a is exposed to the cooling airflow. As a lesser quantity of cooling airflow is required during non-afterburning operation, intakes 48b, 48c are sealed by the divergent flap seals 21. A lesser quantity of cooling airflow is directed through the single intake 48a. The cooling airflow which does not pass through the divergent flaps 18 due to the blocked intakes 48b, 48c combines with the core airflow F (FIG. 1) and increases non-afterburning engine efficiency due in part to the associated decrease in pressure and momentum loss. The lesser quantity of diverted cooling airflow C increases engine efficiency.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A convergent/divergent nozzle system comprising:
   a plurality of convergent flaps positionable across a range of angular orientations;
   a plurality of divergent flaps pivotably connected to said convergent flaps at a joint structure and positionable across a range of angular orientations, at least one of said plurality of divergent flaps comprises a multiple of cooling channels, each cooling channel comprising an intake adjacent said joint structure and an outlet aft of said joint structure; and
   a plurality of divergent flap seals intermediate said plurality of divergent flaps, each of said plurality of divergent flap seals at least partially overlapping an adjacent divergent flap to selectively cover and expose at least one of said plurality of intakes in said adjacent divergent flap in response to articulation of said convergent/divergent nozzle system.

2. The convergent/divergent nozzle system as recited in claim 1, wherein each of said divergent flaps comprise a first intake located upon a longitudinal axis, a second intake adjacent to said first intake and a third intake adjacent said first intake.

3. The convergent/divergent nozzle system as recited in claim 2, wherein each of said multiple of intakes are located adjacent to said joint structure to receive a cooling airflow from said plurality of convergent flaps.

4. The convergent/divergent nozzle system as recited in claim 2, wherein each of said multiple of outlets comprise a set of outlets.

5. The convergent/divergent nozzle system as recited in claim 2, wherein said multiple of cooling channels are located within each of said plurality of divergent flaps.

6. A convergent/divergent nozzle system comprising:
   a multitude of convergent flaps positionable across a range of angular orientations;
   a multitude of divergent flaps each of said multitude of divergent flaps connected to one of said multitude of convergent flaps at a joint structure and positionable across a range of angular orientations, at least one of said multitude of divergent flaps comprises a multitude of intakes each in communication with a respective cooling channel; and
   a multitude of divergent flap seals, each of said multitude of divergent flap seals intermediate and at least partially overlapping an adjacent first and second divergent flap of said multitude of divergent flaps to selectively cover and expose at least one of said multitude of intakes in response to articulation of said convergent/divergent nozzle system.

7. The convergent/divergent nozzle system as recited in claim 6, wherein each of said intakes are located in a line generally parallel to a hinge axis defined by said joint structure.

8. The convergent/divergent nozzle system as recited in claim 6, wherein each of said intakes are located downstream of a hinge axis defined by said joint structure.

9. The convergent/divergent nozzle system as recited in claim 6, wherein said multiple of cooling channels are defined within said at least one of said multitude of divergent flaps.

10. A convergent/divergent nozzle system comprising:
    a multitude of convergent flaps positionable across a range of angular orientations;
    a multitude of divergent flaps each of said multitude of divergent flaps connected to one of said multitude of convergent flaps at a joint structure and positionable across a range of angular orientations, at least one of said multitude of divergent flaps comprises at least a first intake, a second intake and a third intake in communication with a respective first cooling channel, second cooling channel, and third cooling channel; and
    a multitude of divergent flap seals including a first divergent flap seal and a second divergent flap seal at least partially overlapping and adjacent said at least one of said multitude of divergent flaps to selectively cover and expose said second intake by said first divergent flap seal and said third intake by said second divergent flap seal in response to articulation of said convergent/divergent nozzle system.

11. The convergent/divergent nozzle system as recited in claim 10, wherein said first intake is located upon a longitudinal axis of said at least one of said multitude of divergent flaps.

12. The convergent/divergent nozzle system as recited in claim 10, wherein said first intake, said second intake and said third intake are located in a line generally parallel to a hinge axis defined by said joint structure.

13. The convergent/divergent nozzle system as recited in claim 10, wherein said multiple of cooling channels are defined within said at least one of said multitude of divergent flaps.

\* \* \* \* \*